United States Patent
Kuhar et al.

(10) Patent No.: US 6,929,208 B2
(45) Date of Patent: Aug. 16, 2005

(54) CARTRIDGE HOUSING FOR INHIBITING DAMAGE TO RECORDING MEDIA

(75) Inventors: James Justin Kuhar, Broomfield, CO (US); Stephen Stamm, Fort Lupton, CO (US)

(73) Assignee: Quantum Corporation, San Jose, CA (US)

( * ) Notice: Subject to any disclaimer, the term of this patent is extended or adjusted under 35 U.S.C. 154(b) by 324 days.

(21) Appl. No.: 10/183,232

(22) Filed: Jun. 25, 2002

(65) Prior Publication Data

US 2003/0234307 A1 Dec. 25, 2003

(51) Int. Cl.$^7$ ............................................. G11B 23/107
(52) U.S. Cl. ..................... 242/348; 242/347; 360/132
(58) Field of Search ................................. 242/348, 347; 360/132

(56) References Cited

U.S. PATENT DOCUMENTS

| | | | | |
|---|---|---|---|---|
| 4,676,370 A | * | 6/1987 | Rudick | 206/1.5 |
| 5,913,420 A | | 6/1999 | Morita | |
| 6,499,686 B2 | * | 12/2002 | Tsuyuki et al. | 242/348 |

* cited by examiner

Primary Examiner—Kathy Matecki
Assistant Examiner—Evan H Langdon
(74) Attorney, Agent, or Firm—James P. Broder; Steven G. Roeder (57) ABSTRACT

A cartridge assembly (10) includes a cartridge (12) and a cartridge retainer (14). The cartridge (12) includes a reel (22) having a rotational axis (46) and a flange (48, 50). The cartridge (12) also includes a cartridge housing (16) that rotatably secures the reel (22). The cartridge housing includes one or more interior surfaces (19, 21). The reel (22) is adapted to tilt relative to the cartridge housing (16). The cartridge housing (16) includes a plurality of ribs (30) each having a chamfer (72). The ribs (30) can be disposed on an upper housing section (18) and/or a lower housing section (20) of the cartridge housing (16). The reel (22) has a contact tilt angle $\theta_1$ relative to the interior surface (19, 21), and at least one of the chamfers (72) has a chamfer angle $\theta_2$ relative to the interior surface (19, 21) that is substantially similar to the contact tilt angle $\theta_1$. The flange (48, 50) contacts the chamfer (72) so that the flange (48, 50) is substantially parallel with the chamfer (72). The cartridge (12) can also include a positioner rib (66) for laterally positioning the reel (22). Further, a flange edge (56, 60) of the flange (48, 50) does not contact the cartridge housing (16) when the reel (22) tilts. The cartridge assembly (10) includes a reel positioner (36) that biases the reel (22) of the cartridge (12) toward the upper housing section (18) of the cartridge housing (16) while the cartridge (12) is retained within the cartridge retainer (14).

49 Claims, 8 Drawing Sheets

CARTRIDGE HOUSING FOR INHIBITING DAMAGE TO RECORDING MEDIA

FIELD OF THE INVENTION

The invention relates to the field of media cartridges that include a recording medium.

BACKGROUND

Magnetic tape cartridges have been used to conveniently and efficiently store and handle magnetic recording media for tape drives. One type of tape cartridge consists of a substantially rectangular exterior cartridge housing and a single reel containing a magnetic tape positioned within the housing. The cartridge housing includes an upper housing section and a lower housing section which substantially enclose the magnetic tape, which includes a cartridge leader. The cartridge leader becomes exposed through an opening in the cartridge housing during insertion of the cartridge into the tape drive. The tape drive is then able to engage and retrieve the tape from the cartridge for recording and/or playback.

The reel includes a hub, one or more flanges and a plurality of teeth that are exposed through an access opening in the lower housing section. A drive clutch on the tape drive engages the teeth in order to rotate the reel. Typically, a spring within the cartridge housing biases the reel toward the lower housing section. During engagement between the drive clutch and the teeth, the tape drive exerts a force against the reel, urging the reel toward the upper housing section, thereby partially compressing the spring to promote a secure engagement between the drive clutch and the reel. The tape drive then rotates the reel and guides the tape across a data transducer that reads data from and/or writes data to the tape. Although the reel can move generally longitudinally along the rotational axis, the reel can also move somewhat axially relative to the lower and upper housing sections to allow for drive tolerances.

While movement of reel between upper housing section and lower housing section is necessary during normal operation in a tape drive, it has been found that such movement presents problems during handling outside the tape drive. In particular, undesired movement of reel may damage the magnetic tape which is wound thereon. For example, if the cartridge is dropped or otherwise severely jostled, axial or tilting movement of reel may result in contact between the one or more flanges and the cartridge housing, which can cause contact between one or more flanges of the reel and the tape. In general the flanges can be relatively thin and can deflect somewhat easily. Because the current design preference among tape manufacturers is to develop tape that is thinner to increase storage capacity, such tape is also more easily damaged. Besides damage at the outside edge of the tape, winding phenomena which results in the uneven or staggered wrap (i.e. packslip, popped strand) of the tape onto the reel, also renders the tape vulnerable to damage. For example, damage to the magnetic tape may result in incorrect data reading and/or writing, or lost data by the tape drive.

Accordingly, the need exists to provide a cartridge that inhibits damage to the tape due to axial movement of the reel within the cartridge housing. Further, the need exists to provide a cost-effective, efficient method of manufacturing a media cartridge that promotes increased accuracy in reading and writing by the tape drive.

SUMMARY

The present invention is directed toward a cartridge assembly that includes a cartridge and a cartridge retainer. The cartridge includes a cartridge housing and a reel having a flange with a flange surface. The housing rotatably secures the reel and allows the reel to rotate about a rotational axis. The reel is adapted to tilt relative to the cartridge housing. The cartridge housing includes a rib having a proximal contact point and a distal contact point. The proximal contact point is positioned closer to the rotational axis than the distal contact point, and the flange surface contacts both contact points when the reel sufficiently tilts relative to the cartridge housing.

The rib can also include a chamfer. In certain embodiments, the reel has a contact tilt angle relative to the cartridge housing, and the chamfer has a chamfer angle relative to the cartridge housing that is substantially similar to the contact tilt angle. Upon sufficient tilting of the reel, the flange contacts the chamfer so that the flange is substantially parallel with the chamfer.

Further, the rib can be radially positioned relative to the rotational axis. The cartridge can also include a positioner rib that is disposed on the cartridge housing. Additionally, the reel can include a central aperture so that the positioner rib at least partially extends into the central aperture for laterally positioning the reel relative to the cartridge housing. The positioner rib can be substantially circular-shaped or disc-shaped as examples.

In another embodiment, the cartridge housing includes a plurality of ribs each having a proximal contact point and a distal contact point. The flange surface contacts both contact points substantially simultaneously on at least one of the ribs when the reel sufficiently tilts relative to the cartridge housing. The rib can be disposed on an upper housing section, a lower housing section or both sections of the cartridge housing. Additionally, the flange includes a flange edge positioned at approximately a perimeter of the flange. In this embodiment, the flange edge does not contact the cartridge housing when the reel tilts relative to the cartridge housing.

The cartridge retainer retains the cartridge while the cartridge is not being used by a drive. The cartridge retainer includes a reel positioner that biases the reel of the cartridge toward the upper housing section of the cartridge housing while the cartridge is retained within the cartridge retainer. With this design, the reel is less susceptible to unwanted movement within the cartridge housing.

DESCRIPTION

The description below pertains to several possible embodiments of the invention. It is understood that many variations of the systems and methods described herein may be envisioned by one skilled in the art, and such variations and improvements are intended to fall within the scope of the invention. Accordingly, the invention is not to be limited in any way by the following disclosure of certain illustrative embodiments.

The systems and methods disclosed herein relate to durable tape cartridges. Particularly, the cartridges described herein are more resistant to damage or breakage when dropped, and generate less debris by being more resistant to wear during normal use. For purposes of clarity, the tape cartridges described herein will be described as cartridges for holding a length of tape, such as a length of recording tape for storing computer data, video data, analog signals or any other type of information that can be stored on a tape. However, it will be understood by one of ordinary skill in the art that the cartridges can be employed for other applications.

Figure 1:
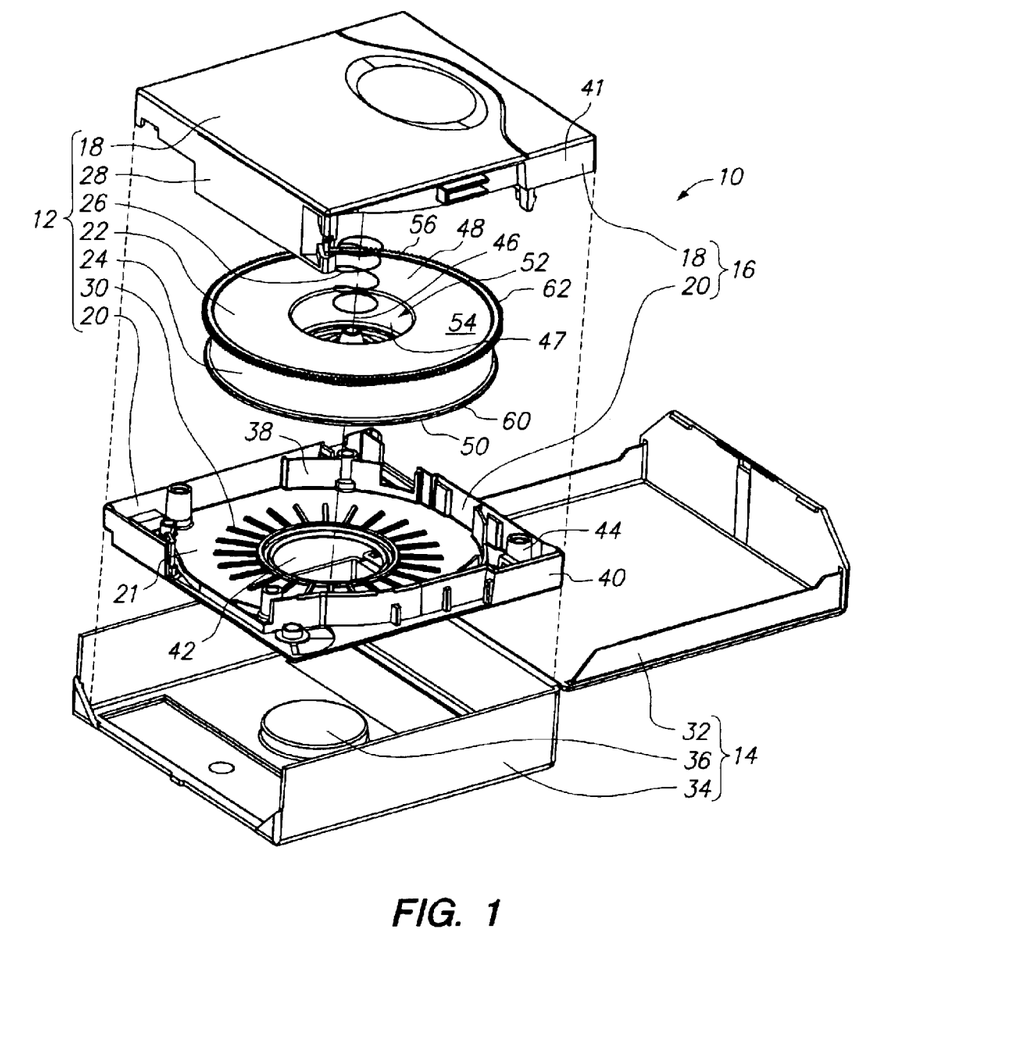
FIG. 1 is an exploded top perspective view of a cartridge assembly having features of the present invention.

FIG. 1 depicts an exploded top perspective view of a cartridge assembly 10 including a cartridge 12 and a cartridge retainer 14. The cartridge 12 is adapted for use with a tape drive 13 (illustrated in FIG. 11) which may or may not be used in a tape library (not shown). The design of the cartridge 12 and the components of the cartridge 12 can be varied. In FIG. 1, the cartridge 12 includes a cartridge housing 16 having an upper housing section 18 that includes an upper interior surface 19 (shown in FIG. 2), a lower housing section 20 that includes a lower interior surface 21, a reel 22, a tape 24 wound around the reel 22, a exerter 26 and a door 28. The cartridge housing 16 also includes one or more spaced apart ribs 30 that inhibit damage to the reel 22 and the tape 24. The cartridge retainer 14 includes a retainer top 32, a retainer bottom 34 and a reel positioner 36.

The cartridge housing 16 rotatably secures and protects the reel 22 and the tape 24 from damage. The design of the cartridge housing 16 can vary depending upon the design requirements of the cartridge 12 and the reel 22. The cartridge housing 16 can be formed from any suitably strong material that inhibits damage upon an impact to the cartridge 12. For example, materials that are substantially free of glass fibers can be used to form the cartridge housing 16. Suitable materials include metal, plastic, rubber, ceramics, and composites thereof. A particular example of a plastic commonly used for forming cartridge housings 16 is polycarbonate. Use of a material lacking these glass fibers can not only strengthen the plastic with respect to impact, but can make the material more resistant to the wear encountered during normal use of the cartridge 12. Furthermore, use of a material substantially free of glass fibers increases the life of the molds used to manufacture the cartridge housings 16. Increasing the life of the molds reduces the cost of manufacturing such cartridge housings 16.

The cartridge housing 16 may be of any shape or dimension which permits a reel 22 to be contained therein, and which allows the cartridge 12 to appropriately fit into the tape drive. The cartridge housing 16 shown in FIG. 1 is box-shaped and contains the reel 22, although other shapes, including disc-shaped, elliptical, square, and triangular cartridge housings 16, which may contain one or more reels 22, are contemplated and encompassed by this invention.

Additionally, the cartridge housing 16 can include one or more interior walls 38 for additional strength and rigidity of the cartridge housing 16. In the embodiment illustrated in FIG. 1, the interior walls 38 are shown on the lower housing section 20. As used herein, the interior walls 38 have a height dimension that is substantially greater than a width dimension. For example, the interior walls 38 can extend the entire distance between the upper interior surface 19 of the upper housing section 18 and the lower interior surface 21 of the lower housing section 20. Alternatively, the interior walls 38 can partially extend between the upper housing section 18 and the lower housing section 20. The interior walls 38 may have a semi-circular contour as shown in FIG. 1, or they may optionally be elliptical, curved, straight, or square in contour. They may be composed of the same material as the cartridge housing 16 and may be of any thickness that provides the desired strength. Further, the interior walls 38 can be formed integrally with the cartridge housing 16, or can be separate structures that are attached to the cartridge housing 16.

The lower housing section 20 includes a plurality of lower side walls 40 that extend from the lower interior surface 21. Further, the lower housing section 20 of the cartridge housing 16 illustrated in FIG. 1 includes a central aperture 42. The central aperture 42 allows for the engagement of an external mechanism 43 (illustrated in FIG. 11) to cause rotation of the reel 22. The external mechanism 43 can be part of the tape drive 13, for example. Although the central aperture 42 is illustrated on the lower housing section 20, the central aperture 42 can alternatively be positioned in the upper housing section 18 of the cartridge housing 16.

The lower housing section 20 may further include one or more screw posts 44 for coupling the lower housing section 20 with the upper housing section 18. Other methods of coupling the lower housing section 20 with the upper housing section 18 will be known to those of skill in the art, and do not depart from the spirit of the systems and methods disclosed herein.

The reel 22 is rotatably mounted within the cartridge housing 16. The reel 22 rotates about a rotational axis 46 during winding or unwinding of the tape 24. The design of the reel 22 can be varied to suit the design requirements of the cartridge 12. The reel 22 illustrated in FIG. 1 includes a hub 47, an upper flange 48, a lower flange 50 and a reel recess 52. The upper flange 48 includes an upper flange surface 54 and an upper flange edge 56, and the lower flange 50 includes a lower flange surface 58 (shown in FIG. 2) and a lower flange edge 60. The lower flange 50 can be formed from materials such as plastic, metal or ceramic, as examples. Alternately, other relatively lightweight materials can be utilized in forming the lower flange 50.

The reel 22 may be of any geometry that permits the reel 22 to hold a length of tape 24. As shown in FIG. 1, a plurality of flange teeth 62 may be disposed along the upper flange edge 56 of the reel 22. Each flange tooth 62 mounted to the reel 22 can be wider at its root to strengthen the flange tooth 62 and thereby reduce or prevent possible shearing of the flange tooth 62 from the reel 22. Alternatively, each flange tooth 62 can have a different configuration. Because the upper flange 48 often includes the flange teeth 62, the upper flange 48 can be formed from materials that are somewhat more rigid and robust than the materials used to form the lower flange 50. For example, the materials used for the upper flange 48 can be similar to those used in forming the cartridge housing 16. Alternatively, the upper flange 48 can be formed from different plastics, metals, ceramics or other suitably strong materials.

The tape 24 is wound around the hub 47 of the reel 22, and can be unwound and/or rewound by the tape drive 13 during reading from and writing to the tape 24. The dimensions of the tape 24 can vary. For example, the tape 24 can have a tape width of approximately one-half inch. Alternately, the tape 24 can have a tape width of between approximately four millimeters and twelve millimeters. The tape 24 can also be wider than one-half inch. Thicknesses of the tape 24 of approximately one-half mil are relatively common, although slightly thinner or thicker tape 24 can be used. In general, thinner tape 24 tends to be less rigid than thicker tape 24, which can lead to decreased control over movement of the tape 24.

The exerter 26 exerts a force to bias the reel 22 toward the lower housing section 20 of the cartridge housing 16. Further, the exerter 26 can bias the reel 22 so that the lower flange surface 58 is substantially parallel to the lower interior surface 21 of the lower housing section 20. In the embodiment illustrated in FIG. 1, the exerter 26 is a spring. One end of the spring can rest against the upper housing section 18 of the cartridge housing 16. The other end of the spring can be set against the reel 22. Any sufficiently resilient material can be used for the exerter 26. Alternatively, other means of biasing the reel 22 against the lower housing section 20 which are known to those skilled in the art can be utilized with the present invention.

Additionally, the cartridge housing 16 includes one or more ribs 30. In the embodiment illustrated in FIG. 1, the lower housing section 20 includes a plurality of spaced apart ribs 30 that are radially disposed from near the central aperture 42 on the lower interior surface 21 of the lower housing section 20. In an alternate embodiment, the ribs 30 can be positioned non-radially. For instance, the ribs 30 can be in a substantially diagonal, spiral, criss-cross, or arc-shaped orientation, as non-exclusive examples. The design of the ribs 30 can be varied to suit the design requirements of the cartridge housing 16 and the reel 22. In this embodiment, the ribs 30 are positioned so that the reel 22 does not contact the lower interior surface 21 of the lower housing section 20 during tilting of the reel 22. Instead, the reel 22 contacts one or more of the ribs 30, which due to their design, inhibit damage to the reel 22 and the tape 24 as provided in greater detail below.

Further, the dimensions of each rib 30 can vary. Each rib 30 can extend from near the central aperture 42 to near one of the lower side walls 40, or they may extend only a portion of that distance. For example, in one embodiment, the length of the ribs 30 disposed on the lower housing section 20 is less than approximately 20 millimeters. In another embodiment, the length of the ribs 30 disposed on the lower housing section 20 is less than approximately 20 millimeters and greater than approximately 5 millimeters. In still another embodiment, the length of the ribs 30 disposed on the lower housing section 20 is less than approximately 16 millimeters and greater than approximately 8 millimeters. The ribs 30 of the lower housing section 20 may extend from the central aperture 42 toward an interior wall 38 or toward a lower side wall 40. Each rib 30 can have a height relative to the interior surfaces 19, 21 of the cartridge housing 16 which is approximately 0.04 inches, for example. In alternate embodiments, the height of each rib 30 can be greater or lesser than 0.04 inches.

The cartridge retainer 14 is used to retain and protect one of the cartridges 12 during periods of non-use, i.e. during storage or transport. The design of the cartridge retainer 14 can vary depending upon the requirements of the cartridge 12. In the embodiment illustrated in FIG. 1, the cartridge retainer 14 includes the retainer top 32, the attached retainer bottom 34, and the reel positioner 36 that is secured to the retainer bottom 34. The retainer top 32 and the retainer bottom 34 can alternatively be two separate structures that fit together to enclose the cartridge 12. The retainer top 32 and the retainer bottom 34 can be formed from materials that will sufficiently absorb a substantial shock to the cartridge retainer 14. Such materials can include various plastics, metals, rubbers, or any other suitable materials.

The reel positioner 36 exerts a force against the reel 22 of the cartridge 12, through the central aperture 42 when the cartridge retainer 14 is closed. This force causes the reel 22 to move toward the upper housing section 18 of the cartridge housing 16. In one embodiment, the reel 22 is biased completely against the upper housing section 18 and/or the structures that are secured to the upper housing section 18. Stated another way, the reel positioner 36 causes the upper flange 48 of the reel 22 to rest against the upper housing section 18 and/or the structures that are secured to the upper housing section 18, thereby enhancing the stability of the reel 22 within the cartridge housing 16. With this design, tilting of the reel 22 is inhibited during storage and transport, which can include during shocks to the cartridge 12.

The reel positioner 36 can be circular, square, triangular or in any other shape that exerts a force on the reel 22 to bias the reel 22 toward the upper housing section 18 of the cartridge housing 16. In addition, the reel positioner 36 can have a solid configuration or can be ring-shaped, as non-exclusive examples. The reel positioner 36 can be formed from a rigid material in order to exert the appropriate force on the reel 22. Materials such as plastic, epoxy, metal, ceramic or other suitable materials can be utilized with the present invention. Further, the reel positioner 36 can be integrally formed with the retainer bottom 34, or can be a separate structure that is secured to the retainer bottom 34. In an alternate embodiment, the reel positioner is integrally formed with or is secured to the retainer top. In yet an alternate embodiment, the reel positioner is formed as part of the reel, and can be secured to the cartridge housing, for example.

Figure 2:
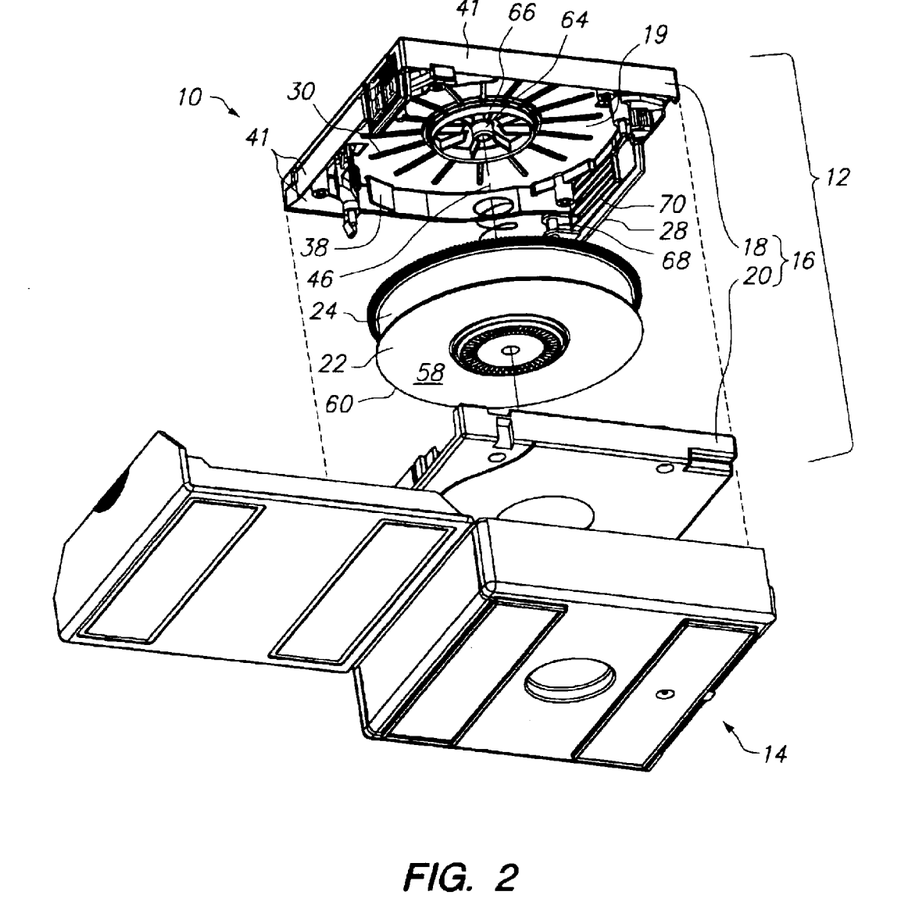
FIG. 2 is an exploded bottom perspective view of the cartridge assembly in FIG. 1.

FIG. 2 illustrates a bottom perspective view of the cartridge assembly 10, including the upper housing section 18, the lower housing section 20, the reel 22 and the cartridge retainer 14. The hub 47 of the reel 22 includes a plurality of hub teeth 63 that engage with the tape drive 13 during rotation of the reel 22.

In this embodiment, the upper housing section 18 of the cartridge housing 16 includes an axle mount 64 and one or more positioner ribs 66. The axle mount 64 is provided for mounting the reel 22 within the cartridge housing 16. The axle mount 64 provides a support upon which the reel 22 may rotate. The design of the axle mount 64 can vary. The axle mount 64 can be any structure which supports the reel 22 and allows it to rotate. Although the axle mount 64 in FIG. 2 is illustrated on the upper housing section 18, the axle mount 64 can alternatively be positioned on the lower housing section 20 of the cartridge housing 16.

In the embodiment illustrated in FIG. 2, the positioner rib 66 extends from the upper housing section 18 of the cartridge housing 16 into the reel recess 52 (shown in FIG. 1) when the reel 22 is biased toward the upper housing section 18, i.e. during engagement between the reel 22 and the tape drive (not shown). The positioner rib 66 illustrated in FIG. 2 is substantially circular. However, other suitable configurations of the positioner rib 66 can be incorporated into the present invention. In one embodiment, the positioner rib 66 intersects at least one of the ribs 30 disposed on the upper housing section 18 of the cartridge housing 16. The positioner rib 66 can also provide additional rigidity to the cartridge 12, and can provide added support to the reel 22 during engagement with the tape drive.

In FIG. 2, the door 28 is coupled to the upper housing section 18 of the cartridge housing 16 by a hinge 68. The hinge 68 may be of any design which allows the door 28 to controllably cover and uncover an opening in the cartridge housing 16 to allow the tape 24 to be transferred between a tape drive and the reel 22. The door 28 may be formed from any suitably strong materials and can be reinforced with a stiffener 70 disposed laterally along the surface of the door 28, although more than one stiffener 70 will provide additional reinforcement. The dimensions of the stiffeners 70 can vary, i.e. the stiffeners 70 may be disposed along the entire length of the door 28, or along only a portion of the length of the door 28. Moreover, the door 28 can be any suitable shape, such as rectangular, circular, oval, triangular, etc., that permits for controllably covering and uncovering an opening in the cartridge housing 16 through which the tape 24 travels during use with a tape drive (not shown).

The upper housing section 18 can include a plurality of interior walls 38 that extend from the upper interior surface 19. Additionally, the upper housing section 18 can include one or more ribs 30. The design of the ribs 30 can be varied to suit the design requirements of the cartridge housing 16 and the reel 22. In the embodiment illustrated in FIG. 2, the ribs 30 are radially disposed from near the axle mount 64 on the upper interior surface 19 of the upper housing section 18. In this embodiment, the ribs 30 are positioned so that the reel 22 does not contact the upper interior surface 19 of the upper housing section 18 during tilting of the reel 22. Instead, the reel 22 can contact one or more of the ribs 30, which due to their design, prevent damage to the reel 22 and the tape 24 as provided hereinbelow.

The ribs 30 disposed on the lower housing section 20 and/or the upper housing section 18 may be formed from the material of the cartridge housing 16, or may be formed separately and coupled to one or more of the interior surfaces 19, 21 (only the upper interior surface 19 is shown in FIG. 2). Portions of the rib 30 may protrude from the interior surfaces 19, 21 by differing amounts, or by the same amount. These ribs 30, which may be composed of the same material as the cartridge housing 16, stiffen and reinforce the structure of the cartridge housing 16. There should be at least one rib 30, although there may be as many ribs 30 as may be disposed on the interior surfaces 19, 21 of the cartridge housing 16. The ribs 30 may be spaced evenly or unevenly about the cartridge housing 16, and optionally are disposed such that not all ribs 30 are radial. The ribs 30 need not be straight, but may be curved, circular, angular, or any other shape. The ribs 30 do not protrude into the cartridge housing 16 so much as to impede the rotation of the reel 22, but may be raised enough to provide the desired structural reinforcement.

Further, the length and width of each rib 30 disposed on the upper housing section 18 can vary. Each rib 30 can extend from near the center of the cartridge housing 16 to near one of the upper side walls 41, or they may extend only a portion of that distance. In one embodiment, the length of the ribs 30 disposed on the upper housing section 18 is less than approximately 25 millimeters. In another embodiment, the length of the ribs 30 disposed on the upper housing section 18 is less than approximately 22 millimeters and greater than approximately 5 millimeters. In still another embodiment, the length of the ribs 30 disposed on the upper housing section 18 is less than approximately 20 millimeters and greater than approximately 10 millimeters. As shown in FIG. 2, the ribs 30 disposed on the upper housing section 18 may extend from the positioner rib 66 in a radial direction toward one or more of the upper side walls 41, or toward one or more of the interior walls 38.

The various components described in detail above may all be produced in molds using manufacturing techniques well known in the art. The individual parts may then be assembled and fastened together as needed, according to procedures well known to those of skill in the art.

Figure 3:
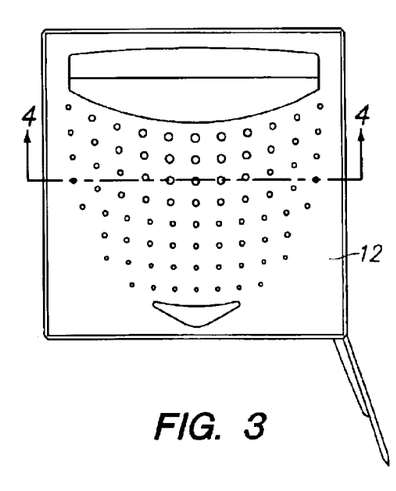
FIG. 3 is a top view of a tape cartridge having features of the present invention.
Figure 4A:
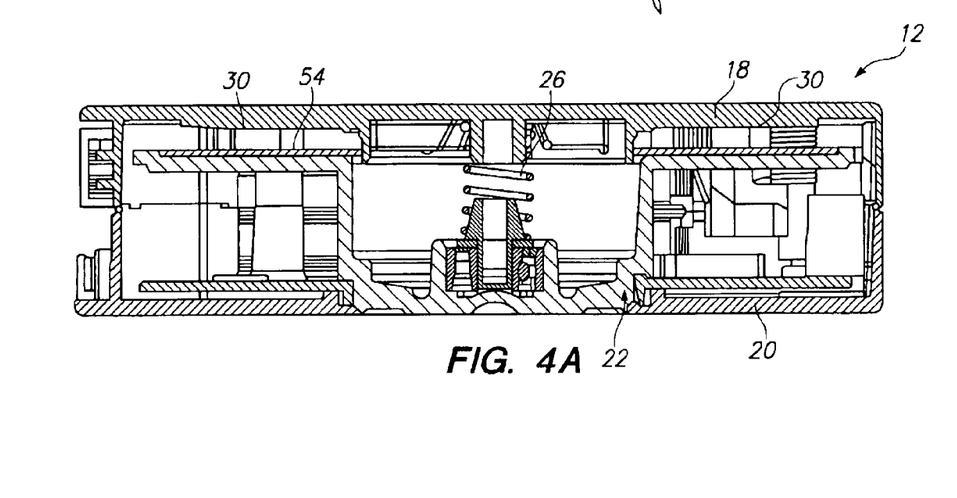
FIG. 4A is a cross-sectional view of an embodiment of the tape cartridge taken on line 4—4 in FIG. 3.
Figure 4B:
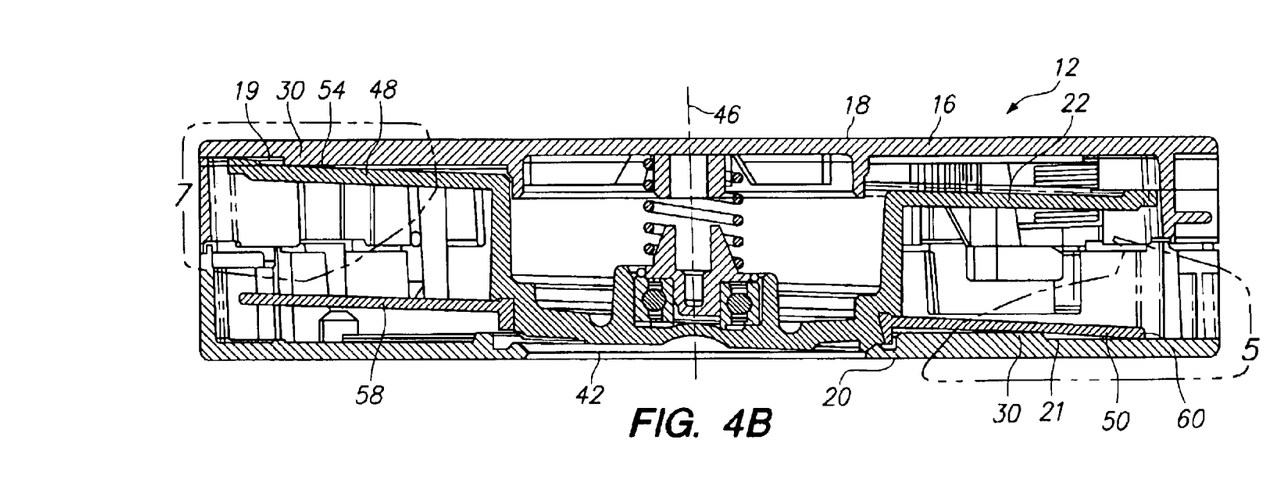
FIG. 4B is a cross-sectional view of the tape cartridge taken on line 4—4 in FIG. 3 with a tilted reel.

FIG. 3 is a top view of a cartridge 12. FIGS. 4A and 4B illustrate cross-sectional views of the cartridge 12 in FIG. 3. FIG. 4A shows the reel 22 of the cartridge 12 in a resting position with no forces being imparted on the reel 22 to move the reel 22 toward the upper housing section 18. The exerter 26 is biasing the reel 22 toward the lower housing section 20. Thus, the upper flange surface 54 of the reel 22 is not contacting the ribs 30 that are disposed on the upper housing section 18.

FIG. 4B illustrates the cartridge 12 including the cartridge housing 16 having the central aperture 42, and the reel 22 in a tilted orientation relative to the cartridge housing 16. This orientation can occur if the cartridge 12 is dropped or otherwise shocked. The reel 22 illustrated in FIG. 4B includes the central aperture 42 In this embodiment, the lower flange surface 58 of the reel 22 is contacting at least one of the ribs 30 that is disposed on the lower housing section 20 of the cartridge housing 16. As illustrated in FIG. 4B, the contact between the ribs 30 and the lower flange surface 58 occurs away from the lower flange edge 60, and occurs where the lower flange 50 is more rigid. In addition, the upper flange surface 54 is contacting at least one of the ribs 30 that is disposed on the upper housing section 18 of the cartridge housing 16. Similarly, the contact between the ribs 30 and the upper flange surface 54 occurs away from the upper flange edge 56, and occurs where the upper flange 48 is more rigid. With this design, this contact is less likely to deflect the flanges 48, 50 and cause damage to the tape. Stated another way, the contact between the rib 30 and the flanges 48, 50 does not occur toward the flange edges 56, 60.

In this embodiment, the reel 22 is also permitted to move vertically, substantially along the rotational axis 46 within the cartridge housing 16. During engagement between the reel 22 and a tape drive 13 (illustrated in FIG. 11), the reel 22 can also inherently tilt relative to the cartridge housing 16.

Figure 5:
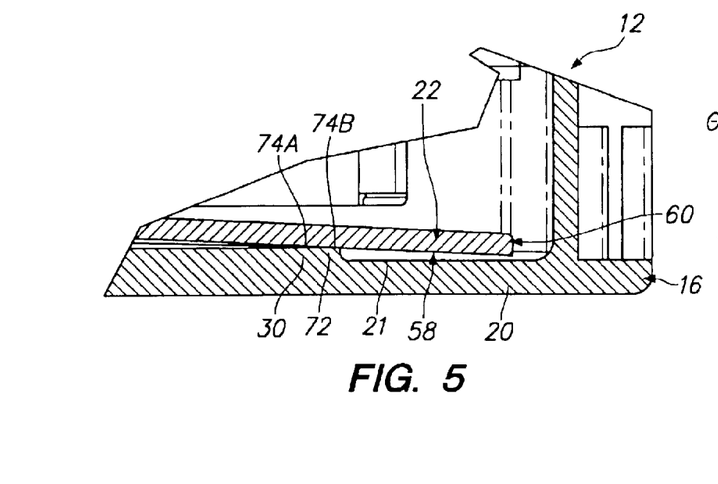
FIG. 5 is an enlarged view of the tape cartridge taken on line 5—5 in FIG. 4B including portions of a flange and a rib.

FIG. 5 is an enlarged view of a portion of the cartridge 12 illustrated in FIG. 4B. In this embodiment, the rib 30 that is disposed on the lower housing section 20 of the cartridge housing 16 includes a beveled region, referred to herein as a chamfer 72. In one embodiment, at least one of the plurality of ribs 30 disposed on the lower housing section 20 includes a chamfer 72. In another embodiment, each of the plurality of ribs 30 disposed on the lower housing section 20 includes a chamfer 72. Each chamfer 72 can include at least two contact points, including a first contact point 74A and a second contact point 74B, that contact the lower flange surface 58 of the reel 22, away from the lower flange edge 60, upon sufficient tilting of the reel 22. The contact points 74A, 74B are positioned so that the first contact point 74A is closer to the central aperture 42 (shown in FIG. 4B) than the second contact point 74B. Stated another way, the first contact point 74A can be referred to as a proximal contact point 74A, and the second contact point 74B can be referred to as a distal contact point 74B. The contact points 74A, 74B can be immediately adjacent to each other, or can be separated by a certain distance. Further, the topography of the rib 30 between the contact points 74A, 74B can vary. For example, the section of the rib between the contact points 74A, 74B can be linear or non-linear. Importantly, either contact point 74A, 74B can be the first contact point or the second contact point.

In one embodiment, the contact points 74A, 74B on the ribs 30 that are disposed on the lower housing section 20 are greater than approximately 0.1 millimeter apart and less than approximately 25 millimeters apart. In another embodiment, the contact points 74A, 74B are greater than approximately 0.5 millimeter apart and less than approximately 10 millimeters apart. In still another embodiment, the contact points 74A, 74B are greater than approximately 1 millimeter apart and less than approximately 5 millimeters apart.

Further, the contact points 74A, 74B can be part of a continuous, substantially flat, angled surface of the rib 30. In other words, the chamfer 72 can include a plurality of continuous contact points 74A, 74B that form a substantially flat, albeit angled, surface relative to the lower interior surface 21. Alternatively, the contact points 74A, 74B can basically be the tops of peaks disposed on the surface of the chamfer 72.

Figure 6:
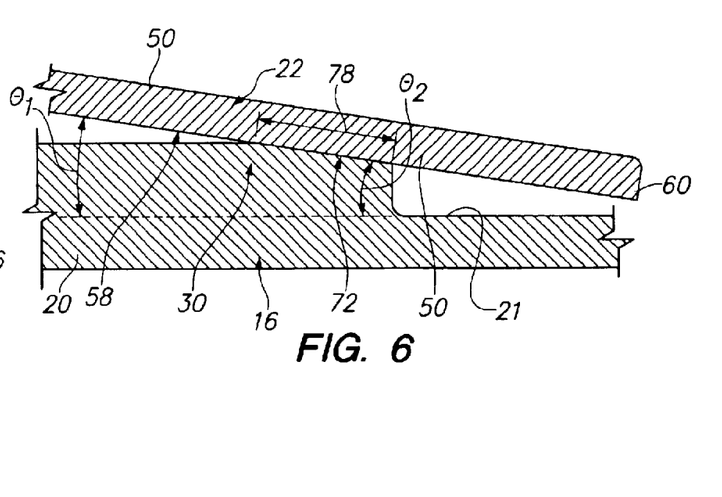
FIG. 6 is an enlarged view of a portion of the flange and the rib illustrated in FIG. 5.

FIG. 6 is an enlarged view of a portion of the rib 30 and the lower flange 50 illustrated in FIG. 5. Each cartridge 12 has a contact tilt angle $\theta_1$ that is formed between the lower flange 50 and the lower interior surface 21 of the lower housing section 20. That is, tilting or axial movement of the reel 22 occurs until lower flange surface 58 of the flange 50 contacts at least one of the ribs 30 disposed on the lower interior surface 21 of the cartridge housing 16. The contact tilt angle $\theta_1$ can vary. In one embodiment, the contact tilt angle $\theta_1$ can be between zero degrees and 30 degrees. Alternatively, the contact tilt angle $\theta_1$ can be greater than 30 degrees.

In this embodiment, the chamfer 72 has a chamfer angle $\theta_2$ relative to the lower interior surface 21 that is substantially similar to the contact tilt angle $\theta_1$ of the reel 22. With this design, the lower flange surface 58 contacts substantially the entire length of the chamfer 72 when the reel 22 sufficiently tilts to the contact tilt angle $\theta_1$. As a result, the force of the contact between the lower flange 50 and the rib 30 is distributed over the surface of the chamfer 72 and a corresponding portion of the lower flange surface 58, which is away from the lower flange edge 60. Thus, because the force on the lower flange 50 due to contact with the rib 30 is spread over an area of the lower flange surface 58 rather than concentrated on a single point near the lower flange edge 60, the lower flange 50 and the tape 24 (not shown in FIG. 6) are less likely to become damaged upon shock to the cartridge 12.

Alternatively, the chamfer angle $\theta_2$ of the ribs 30 disposed on the lower housing section 20 of the cartridge housing 16 can be somewhat greater or lesser than the contact tilt angle $\theta_1$ of the reel 22. For example, in one embodiment, the chamfer angle $\theta_2$ is greater than approximately 20 percent of the contact tilt angle $\theta_1$ and less than approximately 200 percent of the contact tilt angle $\theta_1$. In another embodiment, the chamfer angle $\theta_2$ is greater than approximately 50 percent of the contact tilt angle $\theta_1$ and less than approximately 150 percent of the contact tilt angle $\theta_1$. In still another embodiment, the chamfer angle $\theta_2$ is greater than approximately 75 percent of the contact tilt angle $\theta_1$ and less than approximately 125 percent of the contact tilt angle $\theta_1$. In yet another embodiment, the chamfer angle $\theta_2$ is greater than approximately 90 percent of the contact tilt angle $\theta_1$ and less than approximately 110 percent of the contact tilt angle $\theta_1$.

Further, in one embodiment, the chamfer 72 has a chamfer angle $\theta_2$ relative to the lower interior surface 21 that is greater than zero degrees and less than approximately 60 degrees. In another embodiment, the chamfer angle $\theta_2$ is greater than zero degrees and less than approximately 30 degrees. In still another embodiment, the chamfer angle $\theta_2$ is greater than approximately 1 degree and less than approximately 15 degrees.

Additionally, in one embodiment, the chamfer has a chamfer length 78 that is greater than approximately 0.1 millimeter and less than approximately 25 millimeters. In another embodiment, the chamfer length 78 is greater than approximately 0.5 millimeter and less than approximately 10 millimeters. In still another embodiment, the chamfer length 78 is greater than approximately 1 millimeter and less than approximately 5 millimeters.

Figure 7:
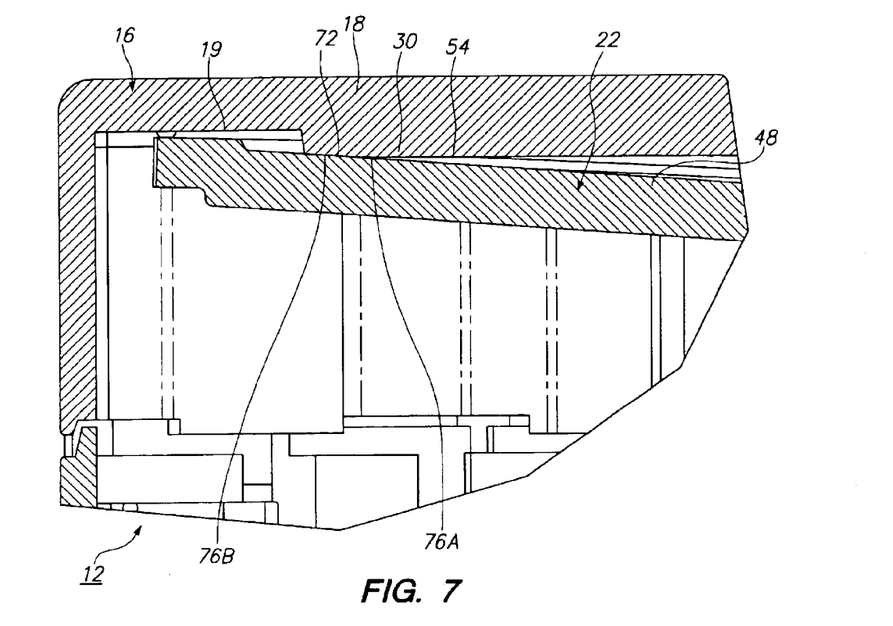
FIG. 7 is an enlarged view of the tape cartridge taken on line 7—7 in FIG. 4B including portions of a flange and a rib.

FIG. 7 is an enlarged view of a portion of the cartridge 12 illustrated in FIG. 4B, including the upper flange 48 and one of the ribs 30 that is disposed on the upper housing section 18 of the cartridge housing 16. In this embodiment, the ribs 30 (only one rib 30 is shown) that are disposed on the upper housing section 18 each include a chamfer 72. In one embodiment, at least one of the plurality of ribs 30 disposed on the upper housing section 18 includes a chamfer 72. Each chamfer 72 can include at least two spaced apart contact points, including a first contact point 76A and a second contact point 76B, that contact the upper flange surface 54 of the reel 22 upon sufficient tilting of the reel 22. The upper flange surface 54 only contacts the chamfer 72 during tilting of the reel 22, and does not contact the upper interior surface 19. The contact points 76A, 76B are positioned so that the first contact point 76A is closer to the axle mount 64 (shown in FIG. 4B) than the second contact point 76B. Stated another way, the first contact point 76A can be referred to as a proximal contact point 76A, and the second contact point 76B can be referred to as a distal contact point 76B. Importantly, either contact point 76A, 76B can be the first contact point or the second contact point.

In one embodiment, the contact points 76A, 76B on the ribs 30 are greater than approximately 0.1 millimeter apart and less than approximately 25 millimeters apart. In another embodiment, the contact points 76A, 76B are greater than approximately 0.5 millimeter apart and less than approximately 10 millimeters apart. In still another embodiment, the contact points 76A, 76B are greater than approximately 1 millimeter apart and less than approximately 5 millimeters apart.

Figure 8:
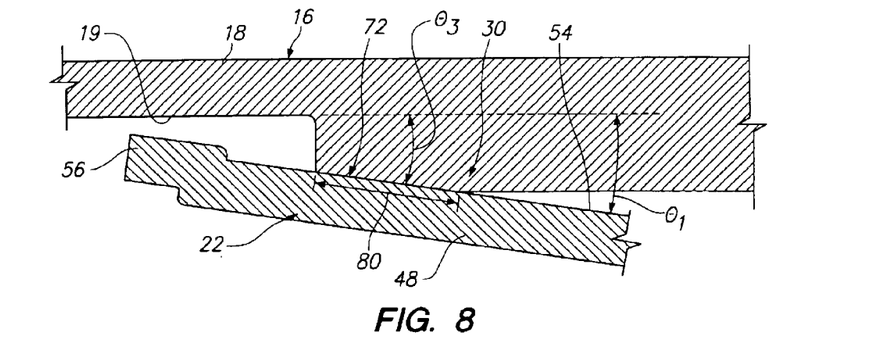
FIG. 8 is an enlarged view of a portion of the flange and the rib illustrated in FIG. 7.

FIG. 8 is an enlarged view of a portion of the rib 30 and the upper flange 48 illustrated in FIG. 7. In this embodiment, the chamfer 72 has a chamfer angle $\theta_3$ relative to the upper interior surface 19 that is substantially similar to the contact tilt angle $\theta_1$ of the reel 22. With this design, the upper flange surface 54 contacts substantially the entire length of the chamfer 72 when the reel 22 sufficiently tilts to the contact tilt angle $\theta_1$. As a result, the force of the contact between the upper flange 48 and the rib(s) 30 is distributed over the surface of the chamfer 72 and a corresponding portion of the upper flange surface 54. Thus, because the force on the upper flange 48 due to contact with the ribs 30 is spread over an area of the upper flange surface 54 rather than concentrated on a single point near the upper flange edge 56, the upper flange 48 and the tape 24 (not shown in FIG. 8) are less likely to become damaged upon shock to the cartridge 12.

Alternatively, the chamfer angle $\theta_3$ of the ribs 30 can be somewhat greater or lesser than the contact tilt angle $\theta_1$ of the reel 22. For example, in one embodiment, the chamfer angle $\theta_3$ is greater than approximately 20 percent of the contact tilt angle $\theta_1$ and less than approximately 200 percent of the contact tilt angle $\theta_1$. In another embodiment, the chamfer angle $\theta_3$ is greater than approximately 50 percent of the contact tilt angle $\theta_1$ and less than approximately 150 percent of the contact tilt angle $\theta_1$. In still another embodiment, the chamfer angle $\theta_3$ is greater than approximately 75 percent of the contact tilt angle $\theta_1$ and less than approximately 125 percent of the contact tilt angle $\theta_1$. In yet another embodiment, the chamfer angle $\theta_3$ is greater than approximately 90 percent of the contact tilt angle $\theta_1$ and less than approximately 110 percent of the contact tilt angle $\theta_1$.

Additionally, in one embodiment, the chamfer 72 has a chamfer angle $\theta_3$ relative to the upper interior surface 19 that is greater than zero degrees and less than approximately 60 degrees. In another embodiment, the chamfer angle $\theta_3$ is greater than zero degrees and less than approximately 30 degrees. In still another embodiment, the chamfer angle $\theta_3$ is greater than approximately 1 degree and less than approximately 15 degrees.

Moreover, in one embodiment, a chamfer length 80 of the chamfer 72 is greater than approximately 0.1 millimeter and less than approximately 25 millimeters. In another embodiment, the chamfer length 80 is greater than approximately 0.5 millimeter and less than approximately 10 millimeters. In still another embodiment, the chamfer length 80 is greater than approximately 1 millimeter and less than approximately 5 millimeters.

Figure 9:
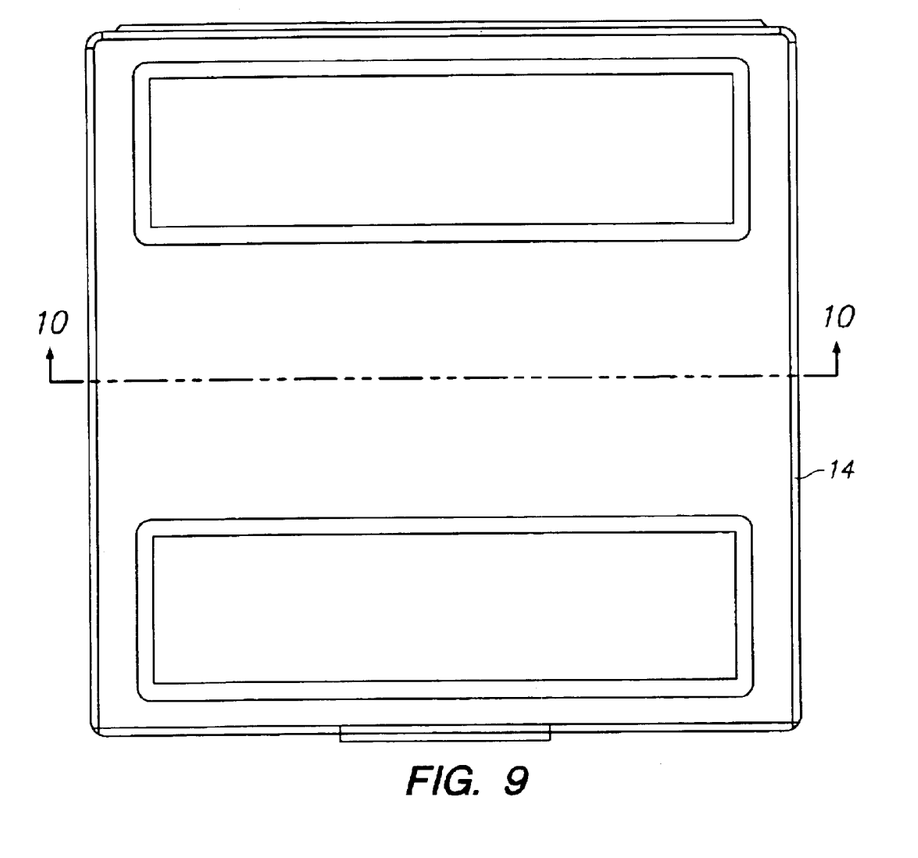
FIG. 9 is a top view of the cartridge retainer and cartridge assembly having features of the present invention.

FIG. 9 is a top view of the cartridge retainer 14 in a closed position. In this embodiment, the cartridge retainer 14 is retaining a cartridge 12 (illustrated in FIG. 10).

Figure 10:
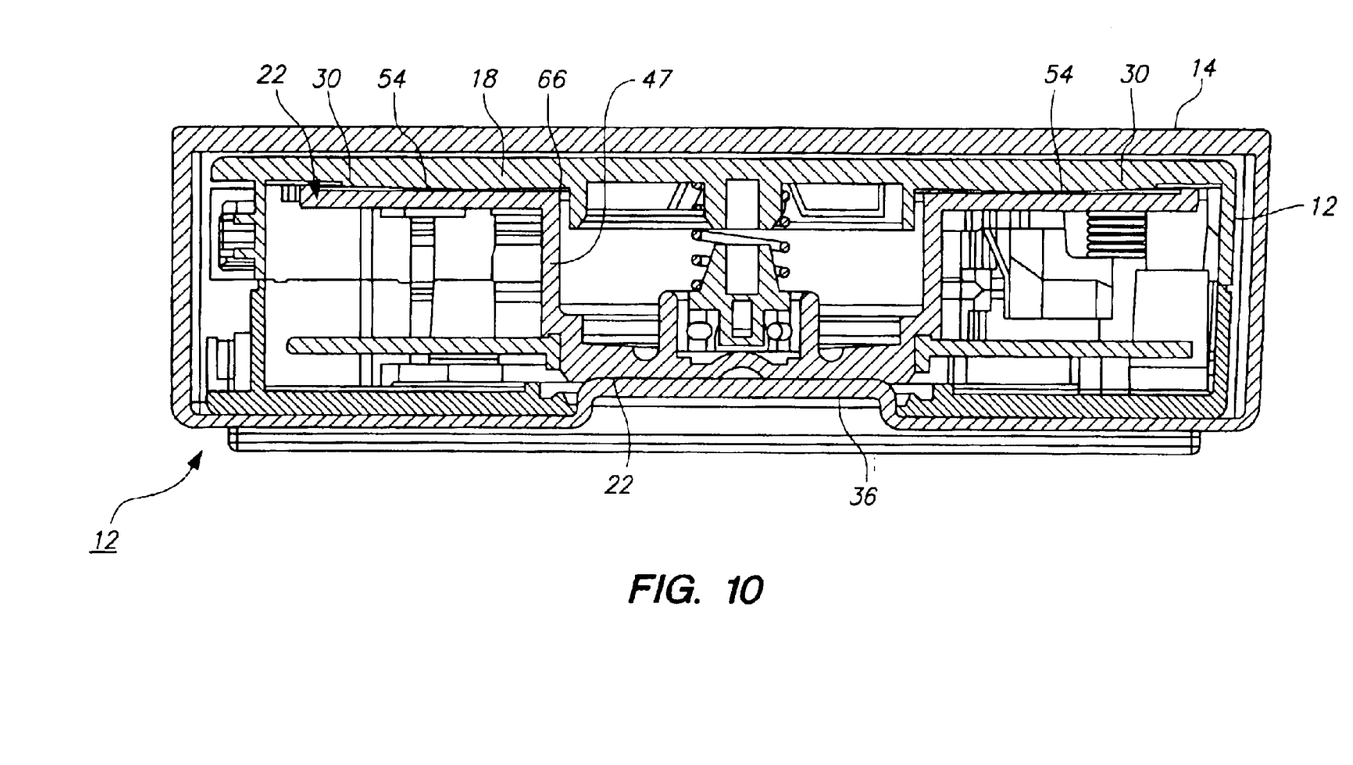
FIG. 10 is a cross-sectional view taken on line 10—10 in FIG. 9.

FIG. 10 is a cross-sectional view of the cartridge retainer 14 and the cartridge 12. As illustrated in FIG. 10, the reel positioner 36 of the cartridge retainer 14 exerts a force on the reel 22 In a direction toward the upper housing section 18 when the cartridge 12 is retained within the cartridge retainer 14 in the closed position.

In this embodiment, the reel positioner 36 biases the upper flange surface 54 of the reel 22 against the positioner rib 66 disposed onto the upper housing section 18. In this position, the upper flange surfaces 54 of the reel 22 have a clearance, e.g. do not make contact with the ribs 30 disposed on the upper housing section 18, thereby reducing the likelihood of damage to the reel 22 and the tape 24. Moreover, the positioning of the positioner rib 66 can be substantially in line with the hub 47 of the reel 22. In this embodiment, the positioner rib 66 can accept a substantially vertical load from the reel 22. With this design, the reel 22 and the tape 24 are less susceptible to damage due to a shock to the cartridge 12.

Figure 11:
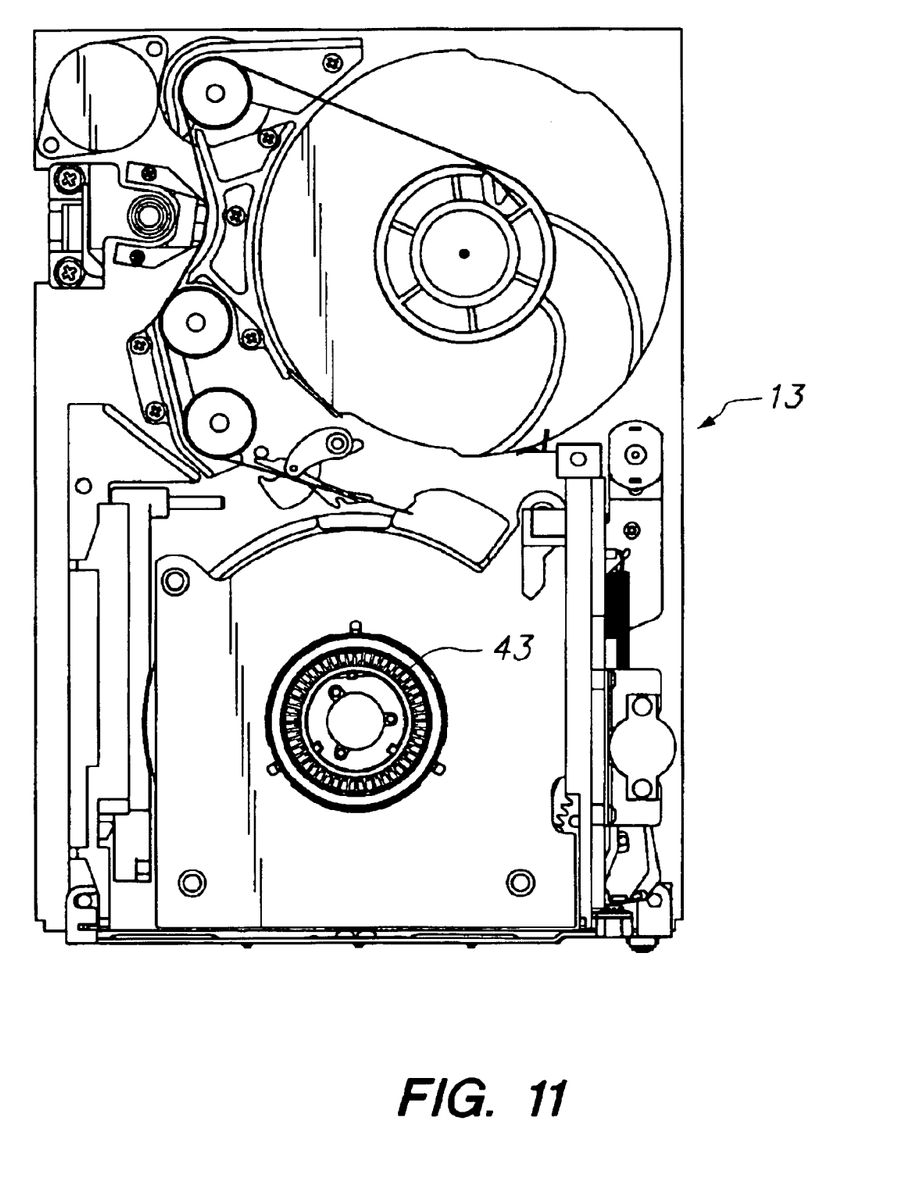
FIG. 11 is a top view of a tape drive having features of the resent invention.

FIG. 11 illustrates one embodiment of a tape drive 13 which can be used in combination with the cartridge 12. A detailed description of various components of the tape drive 13 is provided in U.S. Pat. No. 5,371,638, issued to Saliba, and assigned to Quantum Corporation, the Assignee of the present invention. The contents of U.S. Pat. No. 5,371,638 are incorporated herein by reference. However, the cartridge 12 could be designed for and used with another type of tape drive 13.

While the particular cartridge 12 and cartridge assembly 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A cartridge for use with a tape drive, the cartridge comprising:
   a reel including a flange having a flange surface; and
   a cartridge housing that rotatably secures the reel and allows the reel to rotate about a rotational axis, the reel being adapted move between a tilted position and an untilted position relative to the cartridge housing, the cartridge housing including a rib having a proximal contact point and a distal contact point, the proximal contact point being positioned closer to the rotational axis than the distal contact point, the flange surface contacting both contact points when the reel moves to the tilted position.

2. The cartridge of claim 1 wherein the rib is substantially radially positioned relative to the rotational axis.

3. The cartridge of claim 1 wherein a distance between the contact points is greater than approximately 0.5 millimeters and less than approximately 10 millimeters.

4. The cartridge of claim 1 further comprising a positioner rib that is disposed on the cartridge housing, the positioner rib extending toward the reel a greater distance than the rib so that the reel contacts the positioner rib when the reel is biased toward the cartridge housing in the untilted position.

5. The cartridge of claim 4 wherein the reel does not contact the rib when the reel is biased toward the cartridge housing in the untilted position.

6. The cartridge of claim 4 wherein the positioner rib is substantially circular-shaped.

7. The cartridge of claim 1 wherein the cartridge housing includes a plurality of ribs each having a proximal contact point and a distal contact point, the proximal contact point being positioned closer to the rotational axis than the distal contact point, the flange surface contacting both contact points on at least one of the ribs when the reel sufficiently tilts relative to the cartridge housing.

8. The cartridge of claim 7 wherein each of the ribs is substantially radially positioned relative to the rotational axis.

9. The cartridge of claim 1 wherein the rib includes a chamfer, the contact points being positioned on the chamfer.

10. The cartridge of claim 9 wherein the cartridge housing includes an interior surface, the reel has a contact tilt angle relative to the interior surface, and the chamfer has a chamfer angle relative to the interior surface that is substantially similar to the contact tilt angle.

11. The cartridge of claim 10 wherein the chamfer angle is greater than approximately zero degrees and less than approximately 30 degrees.

12. The cartridge of claim 10 wherein the chamfer angle is greater than approximately 1 degree and less than approximately 15 degrees.

13. The cartridge of claim 9 wherein the flange contacts the chamfer upon sufficient tilting of the reel.

14. The cartridge of claim 9 wherein the chamfer has a chamfer length that is greater than approximately 0.1 millimeters and less than approximately 25 millimeters.

15. The cartridge of claim 9 wherein the chamfer has a chamfer length that is greater than approximately 0.5 millimeters and less than approximately 15 millimeters.

16. The cartridge of claim 9 wherein the chamfer has a chamfer length that is greater than approximately 1.0 millimeters and less than approximately 10 millimeters.

17. The cartridge of claim 1 wherein cartridge housing includes an upper housing section, and wherein the rib is disposed on the upper housing section.

18. The cartridge of claim 1 wherein cartridge housing includes a lower housing section, and wherein the rib is disposed on the lower housing section.

19. The cartridge of claim 18 wherein the cartridge housing includes a plurality of ribs each having a proximal contact point and a distal contact point, the proximal contact point on each rib being positioned closer to the rotational axis than the distal contact point on the corresponding rib, the flange surface contacting both contact points on at least one of the ribs when the reel sufficiently tilts relative to the cartridge housing, and wherein the cartridge housing includes an upper housing section that includes at least one of the ribs.

20. The cartridge of claim 1 wherein a length of the rib is less than approximately 20 millimeters.

21. The cartridge of claim 1 wherein a length of the rib is less than approximately 15 millimeters.

22. The cartridge of claim 1 wherein the flange includes a flange edge positioned substantially at a perimeter of the flange, wherein the flange edge does not contact the cartridge housing when the flange surface contacts the contact points.

23. A cartridge assembly including a cartridge retainer and the cartridge of claim 1, the cartridge housing including an upper housing section, the cartridge assembly including a reel positioner that selectively biases the reel toward the upper housing section.

24. A cartridge assembly including a cartridge retainer and the cartridge of claim 1, the cartridge retainer retaining the cartridge while not being used by the drive, the cartridge housing including an upper housing section, the cartridge retainer having a reel positioner that biases the reel toward the upper housing section of the cartridge housing while the cartridge is retained within the cartridge retainer.

25. A cartridge drive assembly including a tape drive and the cartridge of claim 1.

26. A tape library including a cartridge handler and the cartridge drive assembly of claim 25.

27. A cartridge comprising:
   a cartridge housing including an interior surface and a rib that is secured to the interior surface, the rib including a chamfer having a chamfer angle relative to the interior surface; and
   a reel that is rotatably secured to the cartridge housing, the reel having a rotational axis, the reel contacting the chamfer when the reel tilts at a contact tilt angle relative to the interior surface.

28. The cartridge of claim 27 wherein the contact tilt angle is substantially similar to the chamfer angle.

29. The cartridge of claim 28 wherein the reel includes a flange that contacts the chamfer, the flange being substantially parallel to the chamfer during contact with the chamfer.

30. The cartridge of claim 29 wherein the reel is adapted to tilt relative to the cartridge housing, and wherein the flange includes a flange edge positioned substantially at a perimeter of the flange, wherein the flange edge does not contact the cartridge housing when the flange surface contacts the chamfer.

31. The cartridge of claim 28 wherein the rib is substantially radially positioned relative to the rotational axis.

32. The cartridge of claim 28 further comprising a positioner rib that is disposed on the cartridge housing, the positioner rib extending toward the reel a greater distance than the rib so that the reel contacts the positioner rib when the reel is biased toward the cartridge housing in an untilted position.

33. The cartridge of claim 28 wherein the chamfer angle is greater than approximately zero degrees and less than approximately 30 degrees relative to the cartridge housing.

34. The cartridge of claim 28 wherein the chamfer has a chamfer length that is greater than approximately 1.0 millimeters and less than approximately 10 millimeters.

35. The cartridge of claim 28 wherein cartridge housing includes an upper housing section, and wherein the rib is disposed on the upper housing section.

36. The cartridge of claim 28 wherein cartridge housing includes a lower housing section, and wherein the rib is disposed on the lower housing section.

37. The cartridge of claim 36 wherein the cartridge housing includes a plurality of ribs each having a chamfer with a chamfer angle relative to the interior surface, the reel contacting at least one of the ribs when the reel sufficiently tilts relative to the cartridge housing, and wherein the cartridge housing includes an upper housing section that includes at least one of the ribs.

38. A cartridge assembly including a cartridge retainer and the cartridge of claim 28, the cartridge retainer retaining the cartridge while not being used by the drive, the cartridge housing including an upper housing section, the cartridge retainer having a reel positioner that biases the reel toward the upper housing section of the cartridge housing while the cartridge is retained within the cartridge retainer.

39. A method of inhibiting damage to a cartridge that includes a cartridge housing and a reel having a flange, the reel being adapted to tilt within the cartridge housing upon a sufficient shock to the cartridge, the method comprising the steps of:

positioning a rib having a chamfer within the cartridge housing so that the flange contacts the chamfer upon tilting of the reel.

40. The method of claim 39 wherein the step of positioning a rib includes positioning the chamfer so that the chamfer is substantially parallel to the flange during contact between the chamfer and the flange.

41. The method of claim 40 wherein the chamfer has a chamfer length of at least approximately 1 millimeter.

42. The method of claim 39 wherein the step of positioning a rib includes positioning the rib substantially radially from a rotational axis of the reel.

43. The method of claim 39 further comprising the step of positioning a positioner rib on the cartridge housing so that the positioner rib extends toward the reel a greater distance than the rib so that the reel contacts the positioner rib when the reel is biased toward the cartridge housing in an untilted position.

44. The method of claim 43 wherein the positioner rib is substantially circular-shaped.

45. The method of claim 39 wherein the step of positioning a rib includes positioning the chamfer so that the chamfer has a chamfer angle relative to an interior surface of the cartridge housing that is greater than zero degrees and less than approximately 30 degrees.

46. The method of claim 39 wherein the step of positioning a rib includes positioning the rib so that a flange edge of the reel does not contact the cartridge housing when the flange contacts the chamfer.

47. The cartridge of claim 32 wherein the reel does not contact the rib when the reel is biased toward the cartridge housing in the untilted position.

48. The cartridge of claim 32 wherein the positioner rib is substantially circular-shaped.

49. A cartridge assembly including a cartridge retainer and the cartridge of claim 27, the cartridge housing including an upper housing section, the cartridge assembly including a reel positioner that selectively biases the reel toward the upper housing section.

* * * * *

UNITED STATES PATENT AND TRADEMARK OFFICE
CERTIFICATE OF CORRECTION

PATENT NO. : 6,929,208 B2  Page 1 of 1
APPLICATION NO. : 10/183232
DATED : June 25, 2002
INVENTOR(S) : James Justin Kuhar and Stephen Stamm It is certified that error appears in the above-identified patent and that said Letters Patent is hereby corrected as shown below:

On the title page item (56), In the References Cited:

add the following

US 5,826,811  October 1998  Melbye et al.

Column 3, line 21, please delete "resent" and insert --present--.

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,929,208 B2 | Page 1 of 1 |
| APPLICATION NO. | : 10/183232 | |
| DATED | : August 16, 2005 | |
| INVENTOR(S) | : James Justin Kuhar and Stephen Stamm | |

It is certified that error appears in the above-identified patent and that said Letters Patent is hereby corrected as shown below:

On the title page item (56), In the References Cited:

add the following

US 5,826,811 October 1998 Melbye et al.

Column 3, line 21, please delete "resent" and insert --present--.

This certificate supersedes Certificate of Correction issued August 15, 2006.

Signed and Sealed this

Nineteenth Day of September, 2006

JON W. DUDAS
*Director of the United States Patent and Trademark Office*